(12) United States Patent
Yamamoto et al.

(10) Patent No.: US 8,714,563 B2
(45) Date of Patent: May 6, 2014

(54) ANNULAR ELASTIC GASKET

(75) Inventors: Keita Yamamoto, Okayama (JP);
Kazuhiro Takahashi, Okayama (JP);
Kenji Matsumoto, Aichi (JP)

(73) Assignee: Uchiyama Manufacturing Corp.,
Okayama-shi, Okayama (JP)

( * ) Notice: Subject to any disclaimer, the term of this patent is extended or adjusted under 35 U.S.C. 154(b) by 0 days.

(21) Appl. No.: 13/702,715

(22) PCT Filed: Jun. 10, 2011

(86) PCT No.: PCT/JP2011/063360
§ 371 (c)(1),
(2), (4) Date: Dec. 7, 2012

(87) PCT Pub. No.: WO2011/158750
PCT Pub. Date: Dec. 22, 2011

(65) Prior Publication Data
US 2013/0075980 A1 Mar. 28, 2013

(30) Foreign Application Priority Data

Jun. 15, 2010 (JP) ................................. 2010-135972

(51) Int. Cl.
*F16J 15/32* (2006.01)
(52) U.S. Cl.
USPC ............................. 277/560; 277/549; 277/551
(58) Field of Classification Search
USPC .................................. 277/549, 551, 560, 561
See application file for complete search history.

(56) References Cited

U.S. PATENT DOCUMENTS

| | | | |
|---|---|---|---|
| 6,357,757 B1 * | 3/2002 | Hibbler et al. | 277/551 |
| 7,677,577 B2 * | 3/2010 | Kanzaki et al. | 277/551 |
| 2010/0295253 A1 * | 11/2010 | Tadano et al. | 277/549 |

FOREIGN PATENT DOCUMENTS

| | | |
|---|---|---|
| JP | 63-171648 | 11/1988 |
| JP | 5-87253 | 11/1993 |
| JP | 2002-098231 | 4/2002 |
| JP | 2002-195096 | 7/2002 |
| JP | 2002-295341 | 10/2002 |
| JP | 2006-137076 | 6/2006 |
| JP | 2009-019740 | 1/2009 |
| JP | 2009-150454 | 7/2009 |

* cited by examiner

*Primary Examiner* — Gilbert Lee
(74) *Attorney, Agent, or Firm* — Bacon & Thomas, PLLC

(57) ABSTRACT

An annular elastic gasket adapted to be disposed between an insertion hole formed in a housing and a cylindrical body which is inserted into the housing via the insertion hole in such a manner that the annular elastic gasket elastically contacts an inner surface of the insertion hole and an outer circumferential surface of the cylindrical body. The annular elastic gasket comprises a hollow cylindrical gasket base body comprised of a molded body made of an elastic material, to be compressedly fitted and retained in the insertion hole, an annular seal lip portion extending in the centripetal direction from the gasket base body and an elastic extending portion which constitutes an extending base portion at an end of a tip side portion of the annular seal lip portion, being bent in such a manner that the end directs in the centripetal direction. The elastic extending portion elastically expands in the diametrical direction together with the tip side portion when the cylindrical body is inserted into the insertion hole, thereby the elastic extending portion elastically contacts the outer circumferential surface of the cylindrical body while maintaining elastic restoring force in the contracting direction.

9 Claims, 10 Drawing Sheets

ANNULAR ELASTIC GASKET

TECHNICAL FIELD

The present invention relates to an annular elastic gasket adapted to be disposed between an insertion hole formed in a housing and a cylindrical body to be inserted into the housing through the insertion hole. For example, the present invention relates to an annular elastic gasket provided between an inverter case and a cooling pipe to be inserted into the inverter case or to an annular elastic gasket provided between a head cover and a plug tube to be inserted into the head cover in a combustion engine.

BACKGROUND ART

Housings, inverter cases or head covers, have an insertion hole and a cylindrical body, cooling pipes or plug tubes are inserted and held in the insertion hole. Holding portions in which the cylindrical body is inserted are provided with an annular gasket made of elastic material such as rubber, or made of synthetic resin for preventing leakage of fluid circulating in the housing. Such an annular gasket has a hollow cylindrical gasket base body held in the insertion hole in a compressed condition and an annular seal lip portion extending in the centripetal direction from the gasket base body to elastically abut the outer circumferential surface of the cylindrical body. Patent Literatures 1 to 4 disclose examples of such a gasket. Patent Literature 5 discloses the annular rubber gasket which has the annular concave groove for holding the fluid equipment such as the thermostat on the inner circumferential surface and is interposed in the joint portion of tubes under a compressed condition.

CITATION LIST

Patent Literature

PTL 1: Japanese Utility Model Publication (not examined) JP-5-87253-U
PTL 2: Japanese Patent Publication (not examined) JP-2002-98231-A
PTL 3 Japanese Patent Publication (not examined) JP-2002-195096-A
PTL 4: Japanese Patent Publication (not examined) JP-2009-19740-A
PTL 5: Japanese Patent Publication (not examined) JP-2006-137076-A

SUMMARY OF INVENTION

Technical Problem

The oil seal ring, annular gasket, disclosed in PTL 1 is designed such that the tongue-like rubber portion, seal lip, having the V-shaped section elastically abuts the outer circumferential surface of the inserted plug tube. In such a case, the tongue-like portion elastically abuts the plug tube because of specific elasticity resulted from the fact that the tongue-like portion is made of rubber and has the V-shaped section. However, bondage force of such abutting is weak, so that there are drawbacks in followability and retention ability relative to vibration of the plug tube and the like. Patent Literature 3 discloses the similar gasket molded from the relatively hard synthetic resin material. It is assumed there are drawbacks in the aptitude such as durability, breakage and the like, of the gasket against vibration of the plug tube. Patent Literatures 2 and 4 disclose the gasket in which the extension spring or the garter spring is embedded in the seal lip having rubber elasticity and bondage force to the plug tube is enforced. However, usage of such an extension spring or a garter spring increases costs, so that needs for lowering cost cannot be achieved.

Patent Literature 5 relates to the molding method for the annular rubber gasket having the annular concave groove on the inner circumferential surface, in which the mold is formed so as to have the annular concave groove on the outer circumferential surface and the inside and outside of the molded body are reversed using the characteristic of rubber after molding in order to facilitate the undercut structure for molding. However, the annular rubber gasket disclosed in Patent Literature 5 is not elastically fitted on the outer circumferential surface of the cylindrical body as mentioned above, and such reverse does not directly relate to bondage force of the cylindrical body relative to the outer circumferential surface.

The present invention is proposed in view of the above-mentioned problems and has an object to provide an easily produced annular elastic gasket with followability and bondage force relative to the cylindrical body without increasing the cost.

Solution to Problem

In the present invention, the annular elastic gasket is adapted to be disposed between an insertion hole formed in a housing and a cylindrical body which is inserted into the housing via the insertion hole in such a manner that the annular elastic gasket elastically contacts an inner surface of the insertion hole and an outer circumferential surface of the cylindrical body. The annular elastic gasket comprises a hollow cylindrical gasket base body comprised of a molded body made of an elastic material, to be compressedly fitted and retained in the insertion hole, an annular seal lip portion extending in the centripetal direction from the gasket base body, and an elastic extending portion which constitutes an extending base portion at an end of a tip side portion of the annular seal lip portion, being bent in such a manner that the end directs in the centripetal direction. The elastic extending portion elastically expands in the diametrical direction together with the tip side portion when the cylindrical body is inserted into the insertion hole, thereby the elastic extending portion elastically contacts the outer circumferential surface of the cylindrical body while maintaining elastic restoring force in the contracting direction.

In the present invention, the elastic extending portion of the annular elastic gasket can be constructed such that it elastically contacts the outer circumferential surface of the cylindrical body when the cylindrical body is inserted into the insertion hole. In such a case, the tip side portion can be constructed such that it elastically contacts the outer circumferential surface of the cylindrical body.

In the present invention, the elastic extending portion of the annular elastic gasket can be constructed such that it is positioned on the back of the tip side portion of the seal lip portion with elastic restoring force in the contracting direction when making it turn back in the centrifugal direction from the centripetal side, with the extending base portion as a base point, and such that it elastically contacts the outer circumferential surface of the cylindrical body with the tip side portion being interposed when the cylindrical body is inserted into the insertion hole. In such a case, the tip side portion of the seal lip portion can be provided with a smallest diameter portion which elastically contacts the outer circumferential surface of the cylindrical body. The elastic extending portion can be formed thicker than the tip side portion of the seal lip portion. Furthermore, when the elastic extending portion is formed thick, corresponding engagement portions which engage each other can be provided at the back of the tip side portion of the seal lip portion in the centrifugal direction and the elastic extending portion, respectively, or the elastic extending portion can have a plurality of cutout portions formed intermittently along its circumferential direction. In addition, a reinforcement member of the annular elastic gasket can be embedded in the gasket base body.

Advantageous Effects of Invention

The annular elastic gasket of the present invention is disposed between the insertion hole formed in the housing and the cylindrical body inserted into the housing through the insertion hole in a condition that the annular elastic gasket elastically contacts the inner surface of the insertion hole and the outer circumferential surface of the cylindrical body. In such a condition, the hollow cylindrical gasket base body is compressed and held in the insertion hole. The gasket base body has the annular seal lip portion extending in the centripetal direction and the elastic extending portion which is formed at the end of the tip side portion of the annular seal lip portion extending in the centripetal direction, the end functioning as the extending base portion. The elastic extending portion expands in the diametrical direction together with the tip side portion when the cylindrical body is inserted and the elastic extending portion is elastically provided on the outer circumferential surface of the cylindrical body while keeping elastic force in the contracting diametrical direction. The gasket base body is elastically held in the insertion hole in a compressed condition and the gasket seals between the inner surface of the insertion hole of the housing and the outer circumferential surface of the cylindrical body, thereby preventing leakage of fluid out of the housing through the inserted portion of the cylindrical body even when fluid circulates in the housing. The elastic extending portion bends in the centripetal direction at the tip side portion of the annular seal lip portion and expands in the diametrical direction to have contracting force when the cylindrical body is inserted, thereby reinforcing elastic attachment to the cylindrical body and achieving accurate sealing. In particular, the elastic extending portion expands in the diametrical direction together with the tip side portion, so that both resilience forces synergize and strong elastic attachment can be accurately achieved.

In case that the elastic extending portion is elastically provided so as to abut the outer circumferential surface of the cylindrical body in the present invention, the elastic extending portion elastically and directly contacts the outer circumferential surface of the cylindrical body and such an elastic contact portion seals the outer circumferential surface of the cylindrical body. In such a case, if the tip side portion is also designed to abut the outer circumferential surface of the cylindrical body, two seal points are actually constituted, thereby further improving the seal performance.

In case that the elastic extending portion is turned up in the centrifugal direction to be positioned on the back of the tip side portion in the centrifugal direction in the present invention, the contracting elastic force of the elastic extending portion acts on the tip side portion of the seal lip portion from the back, thereby reinforcing bondage force of the tip side portion relative to the cylindrical body. Therefore, followability of the cylindrical body relative to vibration and retention ability of the cylindrical body can be improved without an extension spring or a garter spring. In addition, the elastic extending portion is turned up in the centrifugal direction after being formed in the centripetal direction to be positioned on the back of the tip side portion of the seal lip portion in the centrifugal direction, so that a undercut is not required as a molding apparatus for molding the gasket and the mold is not forcibly removed, thereby being superior in the productivity.

In case that the tip side portion of the seal lip portion has the portion smallest in diameter elastically abutting the outer circumferential surface of the cylindrical body in the present invention, contracting elastic force of the elastic extending portion acting from the back of the tip side portion concentrates at the portion smallest in diameter. Therefore, the tip side portion can stably execute elastic abutment to the outer circumferential surface of the cylindrical body and the followability of the cylindrical body relative to vibration and retention ability of the cylindrical body are further improved.

In case that the elastic extending portion is formed thicker than the tip side portion of the seal lip portion, the above-mentioned contracting elastic force increases while the elastic extending portion is turned up as mentioned above, thereby further remarkably achieving the bondage function relative to the cylindrical body. In case that the engagement portion is formed on the back of the tip side portion of the seal lip portion in the centrifugal direction and at the elastic extending portion so as to be engaged each other, the turned-up condition of the elastic extending portion is stabilized and there is no fear that the turned-back elastic extending portion returns in the centripetal direction during storage and transportation or when the cylindrical body is inserted in the annular portion of the annular seal lip portion. In addition, in case that the elastic extending portion has a plurality of hollowed portions formed intermittently along the circumferential direction, the elastic extending portion is easily turned up and is safely kept in such a turned-up condition.

In case that the reinforcement member is embedded in the gasket base body of any one of the above-mentioned annular elastic gaskets, the gasket base body can keep the configuration and is prevented from deforming when the gasket base body is inserted under pressure into the insertion hole, and such compressed insertion becomes stable.

DESCRIPTION OF EMBODIMENTS

Figure 1:
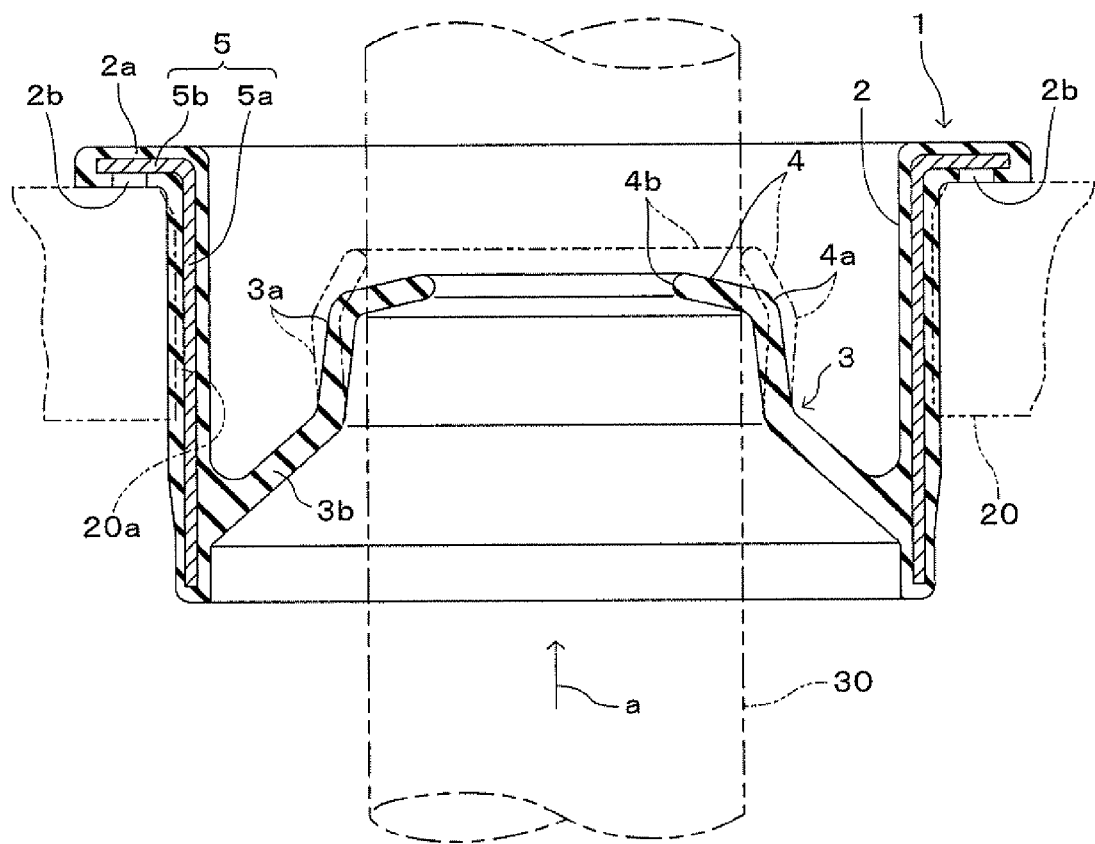
FIG. 1 is a vertical sectional view showing one embodiment of the annular elastic gasket of the present invention together with an object to be applied.

The embodiments of the present invention are explained hereinafter referring to the attached drawings. FIG. 1 is a vertical sectional view showing one embodiment of the annular elastic gasket of the present invention. An annular elastic gasket 1 in the figure is interposed between an insertion hole 20a formed in an inverter case, housing, 20 of a combustion engine and a cooling pipe, cylindrical body, 30 penetrating the inverter case 20 via the insertion hole 20a so as to elastically contact the insertion hole 20a and the cooling pipe 30. The annular elastic gasket 1 comprises a hollow cylindrical gasket base body 2 constituting with a molded body made of an elastic material such as elastomer to be mentioned later and being held in the insertion hole 20a in a compressed condition, an annular seal lip portion 3 extending in a two-stepped tapered condition so as to gradually narrow the diameter in the centripetal direction from one end, lower portion in FIG. 1, to the other end, upper portion in FIG. 1, and an annular extending portion 4 formed at a tip end of a tip side portion 3a of the annular seal lip portion 3. The outer diameter of the gasket base body 2 is designed to be a little larger than the inner diameter of the insertion hole 20a formed in the inverter case 20. The two-stepped annular seal lip portion 3 has a base portion 3b having a larger taper angle on the side of the gasket base body 2 and the tip side portion 3a extending from the base portion 3b and having a smaller taper angle. The extending portion 4 is designed to curve obtusely in such a manner that a tip end portion 4b of the elastic extending portion 4 beyond an extending portion 4a corresponding to the tip end of the tip side portion 3a is linear in the centripetal direction. The inner diameter of the tip end portion 4b is designed to be smaller than the outer diameter of the cooling pipe 30.

An outward flange portion 2a extends from the other end portion of the gasket base body 2 and a metal annular reinforcement member 5 having an L-shaped section and comprising a cylindrical portion 5a and an outward flange portion 5b is embedded within the thickness range of the gasket base body 2 toward the outward flange portion 2a. A plurality of portions 2b in which elastic materials are not provided and the reinforcement members 5 are exposed are formed under the outward flange portion 2a at equal intervals in a circumferential direction. Such a portion 2b without an elastic material is formed when the reinforcement member 5 is held at a predetermined position by a projection formed on a lower mold at the time of molding the annular elastic gasket 1 with a molding apparatus. In addition, although it is not shown in the figure, another exposing portion of the reinforcement member 5 is formed when the lower mold has a positioning portion for centering the reinforcement member 5 on the lower mold and the gasket base body 2 directly contacts the positioning portion.

Preferable examples of the elastomer material constituting the annular elastic gasket 1 are thermoplastic elastomer (olefinine series, polyester series, polyamide series, stylene series, or the like) and a rubber material such as ethylene-propylene rubber (EPDM), acrylonitrill butadiene rubber (NBR), styrene-butadiene rubber (SBR), acrylic rubber (ACM), hydrogenated acrylonitrill butadiene rubber (HNBR), silicone rubber (VMQ), fluorosilicone rubber (FVMQ), fluorine-containing rubber (FKM), butyl rubber, polyisobutylene rubber, ethylene-propylene-diene copolymerized rubber (EPDM), or the like.

The annular elastic gasket 1 is used as shown in FIG. 1. The hollow cylindrical gasket base body 2 is inserted under pressure in a direction opposite to the arrow "a" from an opening shown in the upper portion of the figure into the insertion hole 20a formed in the inverter case 20 which is an object to be used and the outward flange portion 2a formed on the other end of the gasket base body 2 is held on the upper circumferential surface of the insertion hole 20a of the inverter case 20. The outer wall portion of the gasket base body 2 is compressed by the insertion under pressure in the centripetal direction along the position shown with two-dotted lines, inner wall portion of the insertion hole 20a. The reinforcement member 5 is embedded in the gasket base body 2, so that the cylindrical wall does not deform by the compression and the outer wall portion of the gasket base body 2 and the inner wall portion of the insertion hole 20a keep compression contact by the elastic resilience caused by the compression. The boundary surface of both walls is sealed by such compression contact and fluid in the inverter case 20 is prevented from leaking out from the boundary surface.

The cooling pipe 30 is inserted into the annular portion of the annular seal lip portion 3 under pressure in the direction of the arrow "a" from one end of the gasket base body 2. The cooling pipe 30 works at the elastic extending portion 4 upward by the insertion under pressure and the elastic extending portion 4 of the annular seal lip portion 3 elastically expands in the diametrical direction at the position shown with two-dotted lines together with the tip side portion 3a. The tip end portion 4b of the elastic extending portion 4 strongly and elastically abuts the outer circumferential surface of the cooling pipe 30 by resilience caused by the elastic characteristics of the elastic extending portion 4 in a contracting diametrical direction caused by the diametrical expansion together with the tip side portion 3a. The elastic extending portion 4 is designed to curve in the centripetal direction from the tip end of the tip side portion 3a, namely the extending base portion 4a, so that expansion in the diametrical direction together with the tip side portion 3a causes strong elastic resilience in the contracting diametrical direction, whereby the elastic extending portion 4 can strongly and elastically abut the outer circumferential surface of the cooling pipe 30. The contact surface of the elastic extending portion 4 and the outer circumferential surface of the cooling pipe 30 is sealed by such strong elastic abutment, thereby preventing leakage of fluid in the inverter case 20 from the boundary surface. In addition, the cooling pipe 30 can be stably held by the bondage force of the elastic extending portion 4.

Figure 2:
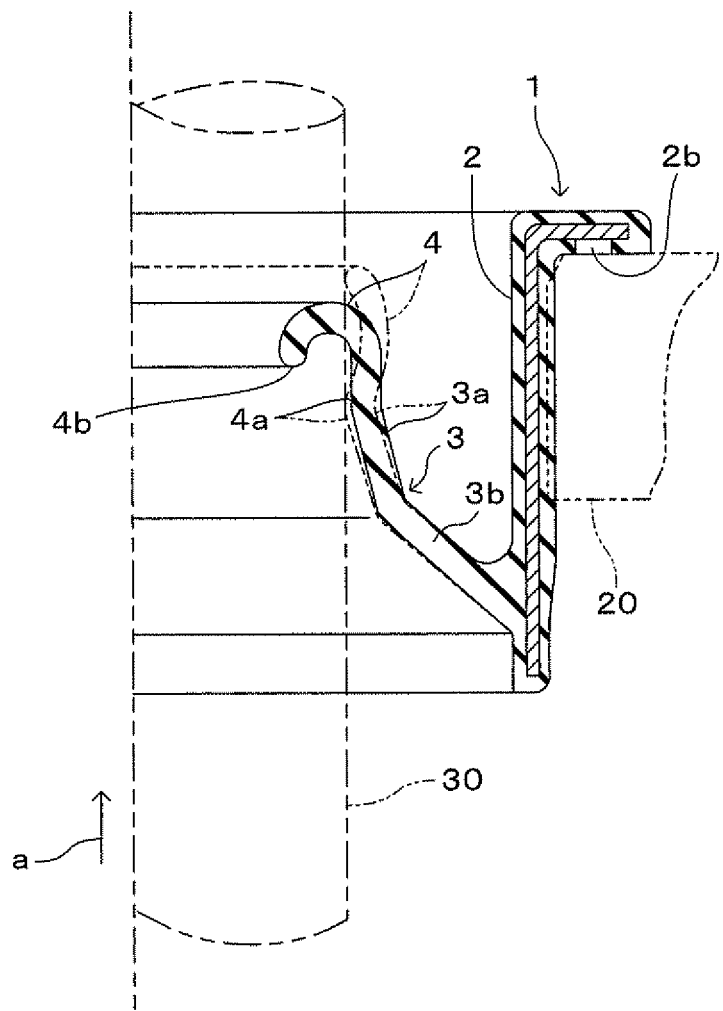
FIG. 2 is a partially broken vertical sectional view showing a modified example of the annular elastic gasket of the above-mentioned embodiment together with an object to be applied.
Figure 3:
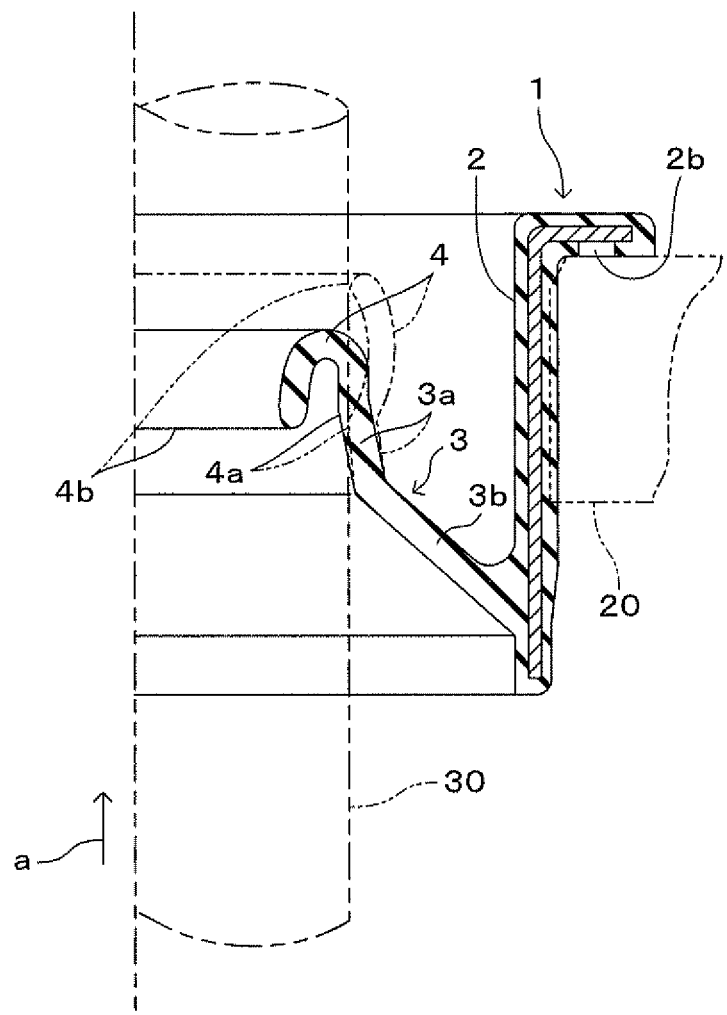
FIG. 3 shows another modified example of the above-mentioned embodiment and is a view similar to FIG. 2.
Figure 4:
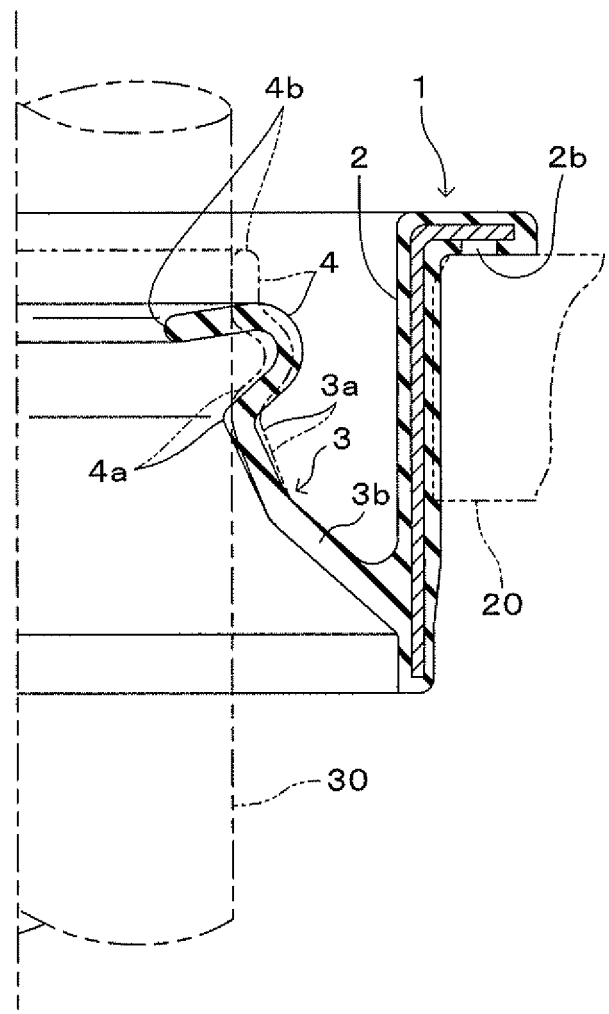
FIG. 4 shows another modified example of the above-mentioned embodiment and is a view similar to FIG. 2.

FIG. 2 to FIG. 4 show modified examples of the above-mentioned embodiment. In each modified example, the elastic extending portion 4 and the tip side portion 3a elastically contact the outer circumferential surface of the cooling pipe 30 and two seal points are substantially formed relative to the outer circumferential surface of the cooling pipe 30 when the cooling pipe 30 is provided as mentioned above.

In FIG. 2 and FIG. 3 the elastic extending portion 4 extends from the extending base portion 4a in the form of a hook curved in the centripetal direction. In the examples, the tip end portion 4b of the hook-like elastic extending portion 4 is formed downward in a direction opposite to the arrow "a" as shown in the figures. In the example of the annular elastic gasket 1 having the such formed elastic extending portion 4, when the cooling pipe 30 of the annular elastic gasket 1 having the elastic extending portion 4 is inserted under pressure into the annular portion of the annular seal lip portion 3 along the direction "a" as mentioned above, the elastic extending portion 4 is pushed upward by the cooling pipe 30 and is expanded in the diametrical direction together with the tip side portion 3a. The elastic extending portion 4 is farmed in the shape of a hook in such a manner that the tip end portion 4b is opposite to the arrow "a", so that pushing-up and diametrical expansion as mentioned above follow large change in the curved radius of the curved portion of the elastic extending portion 4 and the elastic extending portion 4 makes remarkable elastic deformation. As a result, the resilience in the contracting direction stronger than that in the above-mentioned example occurs and a part of the tip side portion 3a including the extending base portion 4a strongly and elastically abuts the outer circumferential surface of the cooling pipe 30 together with the tip end portion 4b of the elastic extending portion 4. Thus the contact boundary surface of the elastic extending portion 4 and the outer circumferential surface of the cooling pipe 30 is stably sealed and leakage of fluid circulating in the inverter case 20 is blocked. In addition, the cooling pipe 30 is more stably held by the bondage force of the elastic extending portion 4. The curvature radius of the curved portion of the elastic extending portion 4 in the example of FIG. 3 is smaller than that in FIG. 2, so that the elastic deformation accompanied with diametrical enlargement becomes larger and the resilience also becomes large, so that the inside of the tip side portion 3a elastically abuts the outer circumferential surface of the cooling pipe 30 under a surface contacting condition in a larger area than the example in FIG. 2.

In FIG. 4, the elastic extending portion 4 is curved in the centrifugal direction in the form of a hook from the extending base portion 4a and then the tip end portion 4b is formed so as to be linear in the centripetal direction. In this example, the linear portion in the centripetal direction curves in the midstream by the shape retention function of the curved portion into the centrifugal direction and the portion from the curved portion to the tip end portion 4b elastically abuts the outer circumferential surface of the cooling pipe 30 under a surface contact condition when the cooling pipe 30 is inserted under pressure and the elastic extending portion 4 is pushed upward. In addition, a part of the tip side portion 3a including the extending base portion 4a also elastically abuts the outer circumferential surface of the cooling pipe 30 under a surface contact condition like the example in FIG. 3. Two abutting portions are formed between the cooling pipe 30 and the annular elastic gasket 1 under a surface contact condition, thereby further improving the sealing performance.

Elastic abutment of the elastic extending portion 4 and the tip side portion 3a to the outer circumferential surface of the cooling pipe 30 in the examples in FIG. 1 to FIG. 4 is not limited to those shown in the figure and abutment includes linear contact, contact of lines, or combination of surface contacts.

Figure 5:
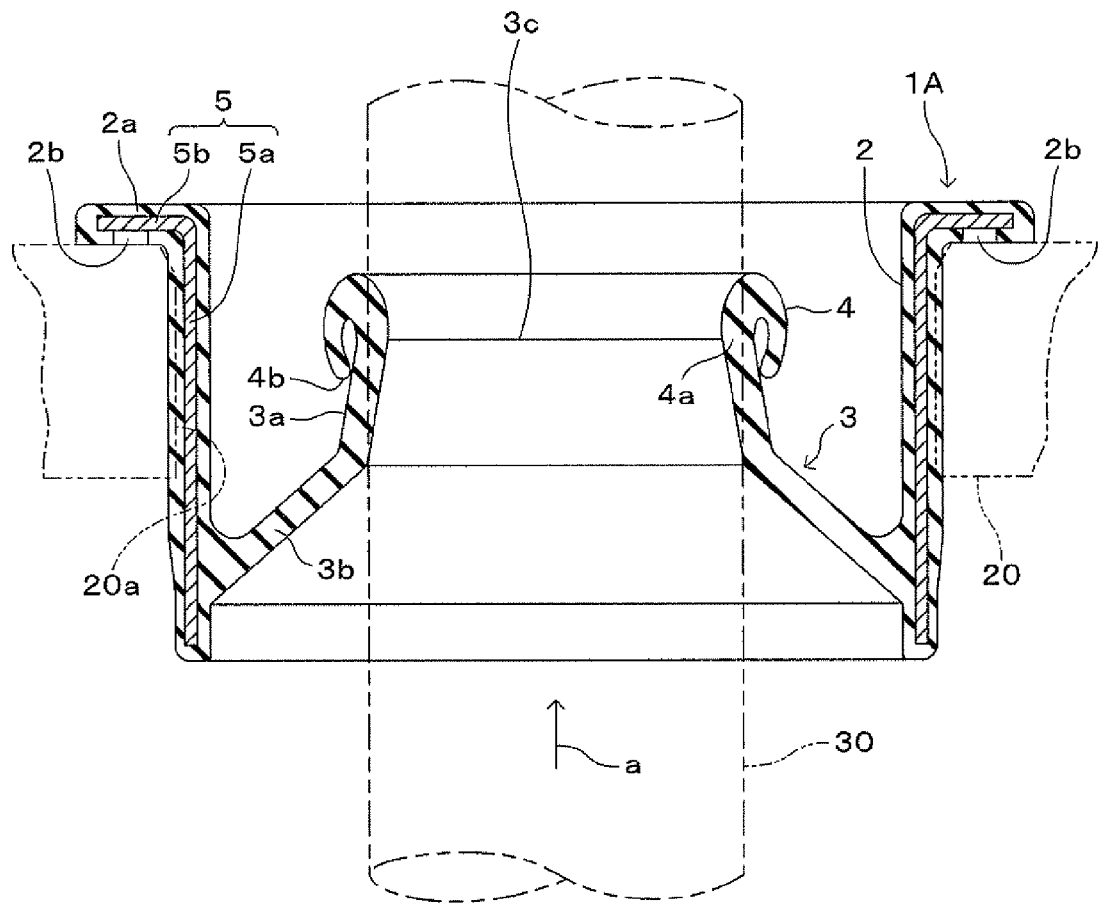
FIG. 5 is a vertical sectional view showing another embodiment of the annular elastic gasket of the present invention together with an object to be applied.

FIG. 5 shows another embodiment of an annular elastic gasket of the present invention. The curved elastic extending portion 4 of an annular elastic gasket 1A in this embodiment is formed on the back portion of the tip side portion 3a of the seal lip portion 3 in the centrifugal direction under such a condition that the elastic extending portion 4 is turned back in the centrifugal direction from the centripetal direction from the tip end of the annular seal lip portion 3, namely the extending base portion 4a and keeps contracting elastic force. A smallest diameter portion 3c, portion being smallest in diameter, elastically abutting the outer circumferential surface of the cooling pipe 30 is formed in the tip side portion 3a of the seal lip portion 3. The smallest diameter portion 3c substantially corresponds to the inner diametrical portion of the extending base portion 4a and is a main body of seal contact relative to the cooling pipe 30 and the inner diameter is designed to be smaller than the outer diameter of the objective cooling pipe 30. The members common to the annular elastic gasket 1 in FIG. 1 have the same reference numerals.

Figure 6:
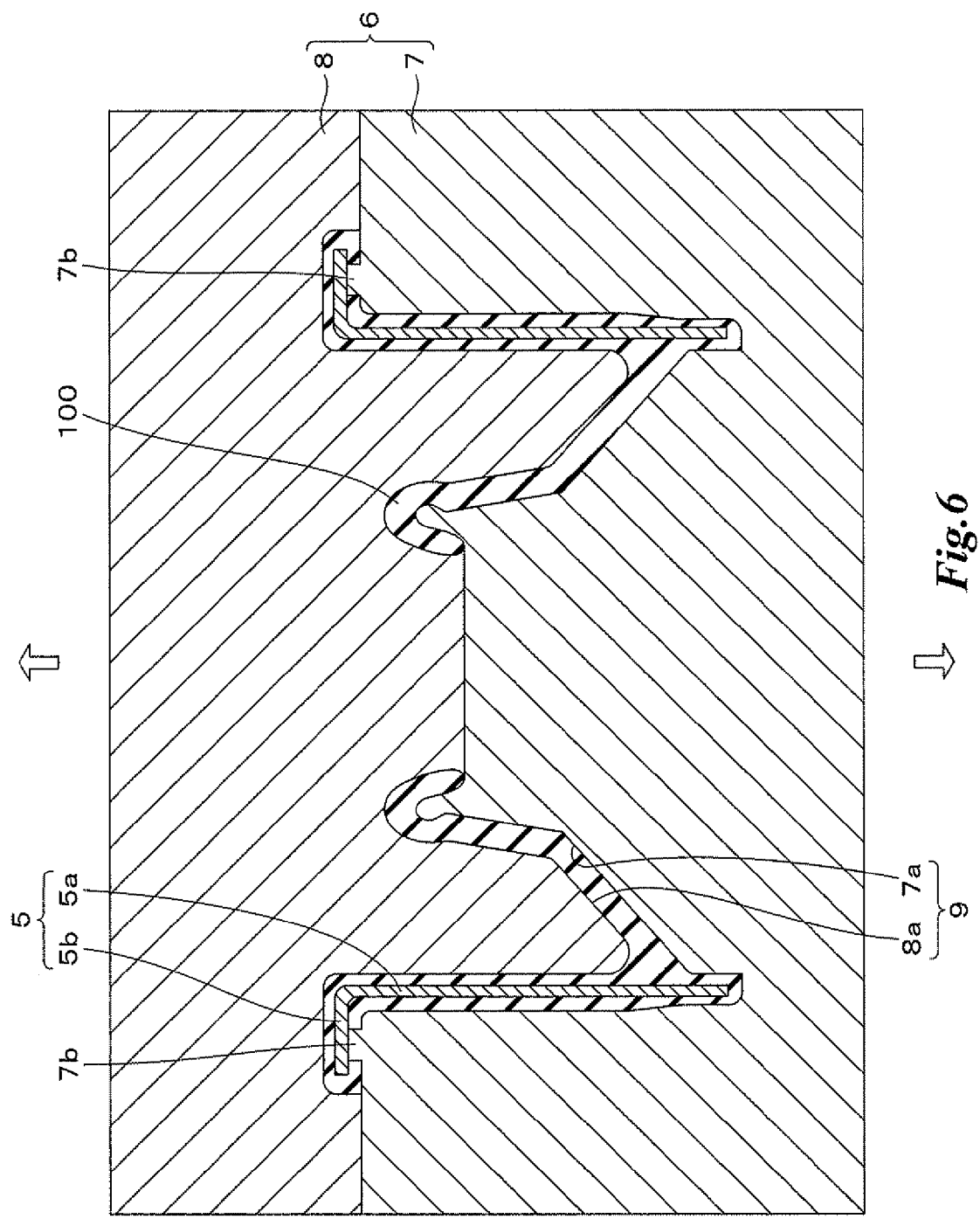
FIG. 6 is a conceptual vertical sectional view showing how a half-finished product of the above-mentioned annular elastic gasket is molded.
Figure 7:
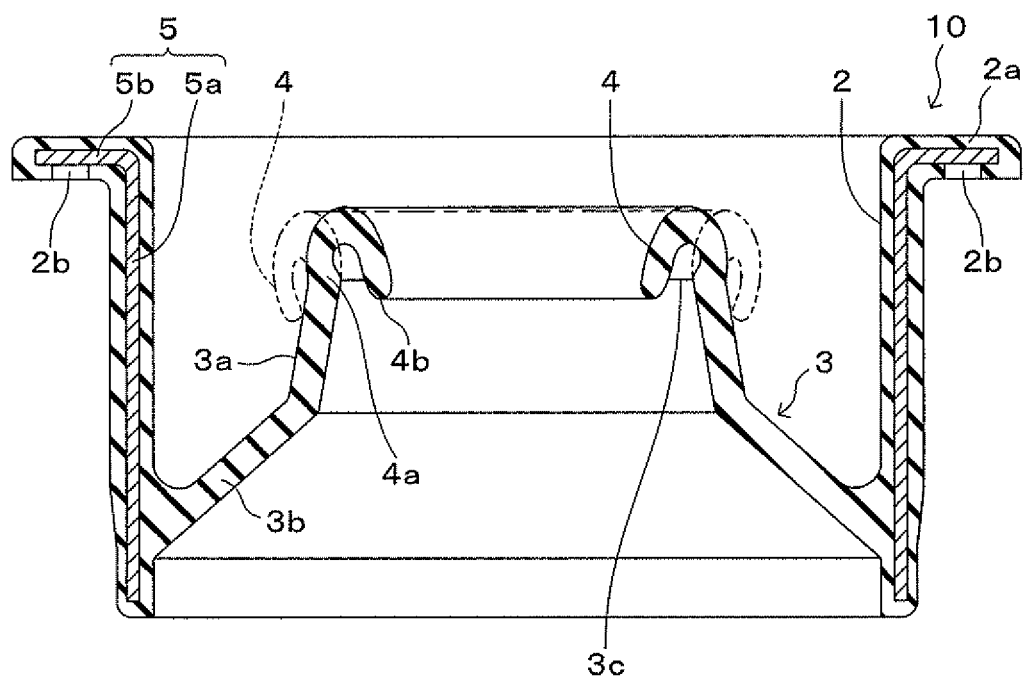
FIG. 7 is a vertical sectional view of the above-mentioned half-finished product.

Next, production procedures of the annular elastic gasket of the present embodiment are briefly explained referring to FIG. 6 and FIG. 7. Specifically, molding procedures of a half-finished product 10 of the annular elastic gasket 1 shown in FIG. 6 and FIG. 7 are explained. FIG. 6 shows a production method using an injection molding apparatus 6. The injection molding apparatus 6 comprises a lower mold 7 having a female mold 7a with a predetermined shape, an upper mold 8 having a male mold 8a with a predetermined shape, and an elastomer injection apparatus, not shown. A plurality of projections 7b are formed on the circumferential upper end surface of the female mold 7a at regular intervals in the circumferential direction. A steel plate of SPCC or stainless steel is pressed before molding to form the reinforcement member 5 having an L-shaped section and comprising the cylindrical portion 5a and the outward flange portion 5b at one end. The reinforcement member 5 is disposed in the female mold 7a of the lower mold 7 in such a manner that the outward flange portion 5b is supported by the projection 7b. When the upper mold 7 and the lower mold 8 are clamped in such a condition, a cavity 9 is formed by the female mold 7a and the male mold 8a as shown in the figure. An unvulcanized or uncrosslinked elastomer material 100 is injected from the injection apparatus into the cavity 9 to be molded. The elastomer material includes those mentioned in the above embodiments.

After the elastomer material 100 is injected into the cavity 9 and vulcanized or crosslinked, both molds 7, 8 are removed as shown in an outlined arrow in FIG. 6, thereby obtaining the half-finished product 10 integrally embedding the reinforcement member 5 as shown in FIG. 7. The half-finished product 10 has the hollow cylindrical gasket base body 2, the annular seal lip portion 3 having the base portion 3b and the tip side portion 3a extending in a two-stepped tapered condition in the centripetal direction from the one end of the gasket base body 2, and the curved elastic extending portion 4 extending from the tip end of the annular seal lip portion 3. The elastic extending portion 4 is formed in the centripetal direction and the tip end portion 4b is formed opposite to the direction "a" (see FIG. 5). The elastic extending portion 4 is manipulated to turn back in the centrifugal direction from the extending base portion 4a as shown with dotted lines in FIG. 7 and the annular elastic gasket 1A is obtained as a final product having the elastic extending portion 4 on the back portion of the tip side portion 3a of the seal lip portion 3 in the centrifugal direction. The elastic extending portion 4, being expanded in the diametrical direction resisting the elastic force, is thus positioned on the back portion of the tip side portion 3a in the centrifugal direction when being turned back, thereby keeping contracting elastic force caused by resilience elastic force. In this case the extending base portion, turned-back base portion, 4a and the smallest diameter portion 3c are preferably positioned at a substantially same place, thereby reducing adverse effects by turning back the elastic extending portion 4 on dimensional design specification of the smallest diameter portion 3c.

In case of molding the half-finished product 10 with the injection molding apparatus 6, the elastic extending portion 4 is formed in the centripetal direction, so that the molding apparatus 6 does not require undercut and the molds 7, 8 are not required to be forcibly removed, thereby having superior productivity. The tip side portion 3a of the annular seal lip portion 3 has the smallest diameter portion 3c which slightly rises into the centripetal direction and the molded body is made of an elastic body such as elastomer, therefore, the smallest diameter portion 3c does not become an obstacle for demolding. The product in FIG. 7 is considered as the half-finished product 10 for producing the annular elastic gasket 1A. However, when manufacturers provide such a half-finished product 10 for users and the users turn back the elastic extending portion 4 for practical use, the half-finished product 10 becomes the final product at distribution level. Examples of injection molding are explained, but it is of course possible to produce the half-finished product 10 by other molding procedures.

The annular elastic gasket 1A is used as shown in FIG. 5. The hollow cylindrical gasket base body 2 is inserted under pressure from one end into the insertion hole 20a formed in the inverter case 20 which is an object to be used and the outward flange portion 2a formed on the other end of the gasket base body 2 is held on the circumferential surface of the insertion hole 20a of the inverter case 20. The outer wall portion of the gasket base body 2 is compressed by insertion under pressure in the centripetal direction along the position shown with two-dotted lines, inner wall portion of the insertion hole 20a. The reinforcement member 5 is embedded in the gasket base body 2, so that the cylindrical wall does not deform by compression and the outer wall portion of the gasket base body 2 and the inner wall portion of the insertion hole 20a keep compression contact by elastic resilience caused by the compression. The boundary surface of both walls is sealed by such compression contact and fluid in the inverter case 20 is prevented from leaking out of the boundary surface. Such functions are the same as those of the annular elastic gasket 1 shown in FIG. 1 to FIG. 4.

The cooling pipe 30 is inserted under pressure into the annular portion of the annular seal lip portion 3 as mentioned above. The tip side portion 3a of the annular seal lip portion 3 is elastically expanded in the centrifugal diametrical direction so as to follow the position shown with two-dotted lines. The resilience caused by the elastic characteristics in the contracting diametrical direction by the diametrical expansion and contracting elastic force of the elastic extending portion 4 have synergetic effects and the tip side portion 3a elastically and strongly abuts the outer circumferential surface of the cooling pipe 30. The contact boundary surface of the tip side portion 3a of the annular sea lip portion 3 and the outer circumferential surface of the cooling pipe 30 is sealed by such strong and elastic abutment, thereby preventing leakage of the fluid circulating in the inverter case 20 out of the boundary surface. Specifically, the elastic extending portion 4 is positioned on the back of the tip side portion 3a in the centrifugal direction while keeping contracting elastic force. When expansion force in the diametrical direction works at the tip side portion 3a, contracting elastic force of the elastic extending portion 4 is further encouraged, the seal function becomes remarkable, and the cooling pipe 30 is stably held by the bondage force. In addition, the tip side portion 3a has the smallest diameter portion 3c, so that the synergized contracting elastic force is concentrated to the smallest diameter portion 3c and the tip side portion 3a stably achieves elastic abutment to the outer circumferential surface of the cooling pipe 30, thereby improving followability of the annular seal lip portion 3a to vibration of the cooling pipe 30 and retention ability of the cooling pipe 30.

Figure 8:
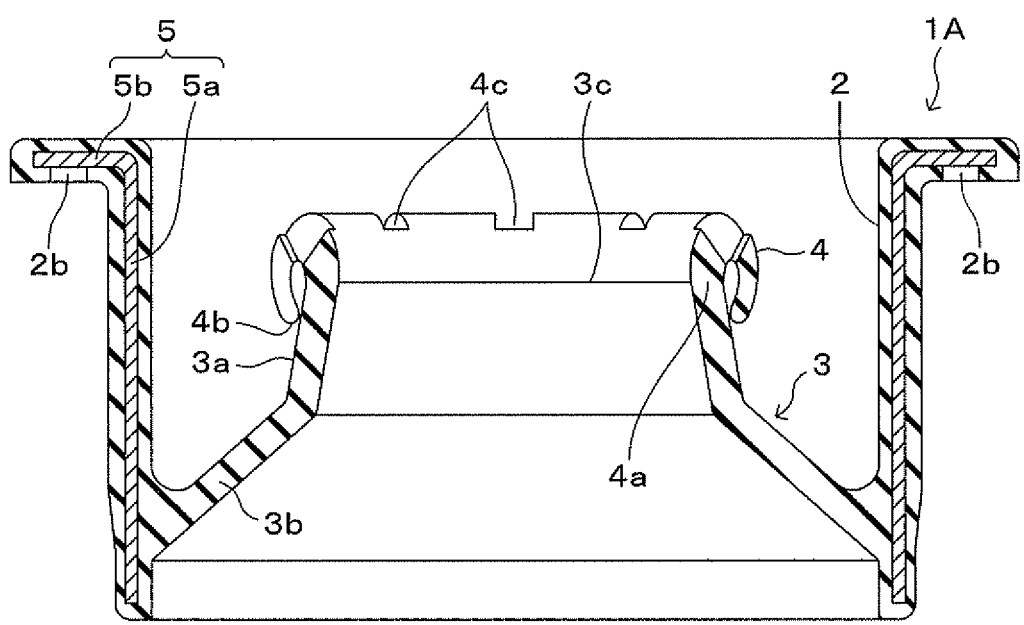
FIG. 8 is a vertical sectional view showing a modified example of the above-mentioned annular elastic gasket.

FIG. 8 shows a modified example of the annular elastic gasket 1A shown in FIG. 5. In this example, a plurality of cutout portions 4c are formed on the curved portion of the elastic extending portion 4 at regular intervals along the circumferential direction. Bending resistance at the curved portion is restrained because of such a plurality of cutout portions 4c on the curved portion, the elastic extending portion 4 is easily turned buck and the turned back condition is stabilized. Other structures are the same as those mentioned above, the same reference numbers are allotted for the common members, and their explanation is omitted here.

Figure 9:
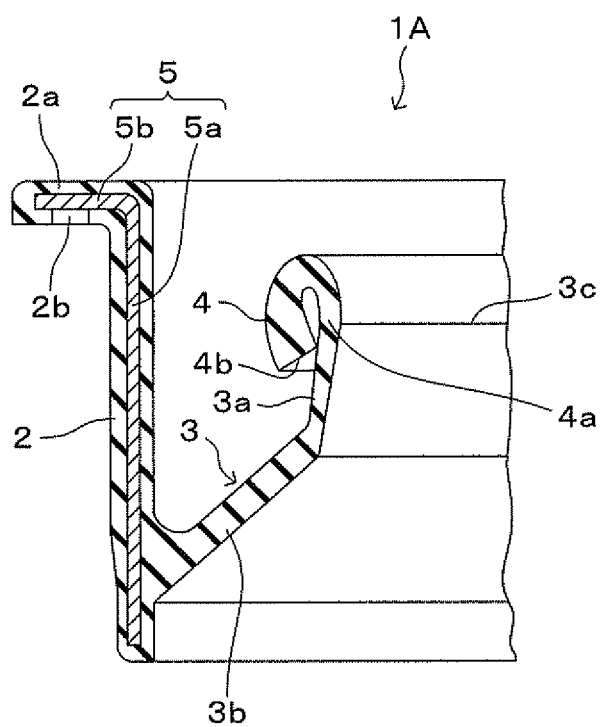
FIG. 9 is a vertical sectional view of a substantial part showing another modified example of the above-mentioned annular elastic gasket.

FIG. 9 shows another modified example of the annular elastic gasket 1A of the above-mentioned embodiment. The annular elastic gasket 1A in this example is characterized in that the elastic extending portion 4 is formed thicker than the tip side portion 3a of the seal lip portion 3 toward the tip end portion 4b. The contracting elastic force of the elastic extending portion 4 while being turned back becomes stronger because the elastic extending portion 4 is thick, thereby remarkably achieving bondage function relative to the cooling pipe 30 in use as shown in FIG. 5.

Figure 10:
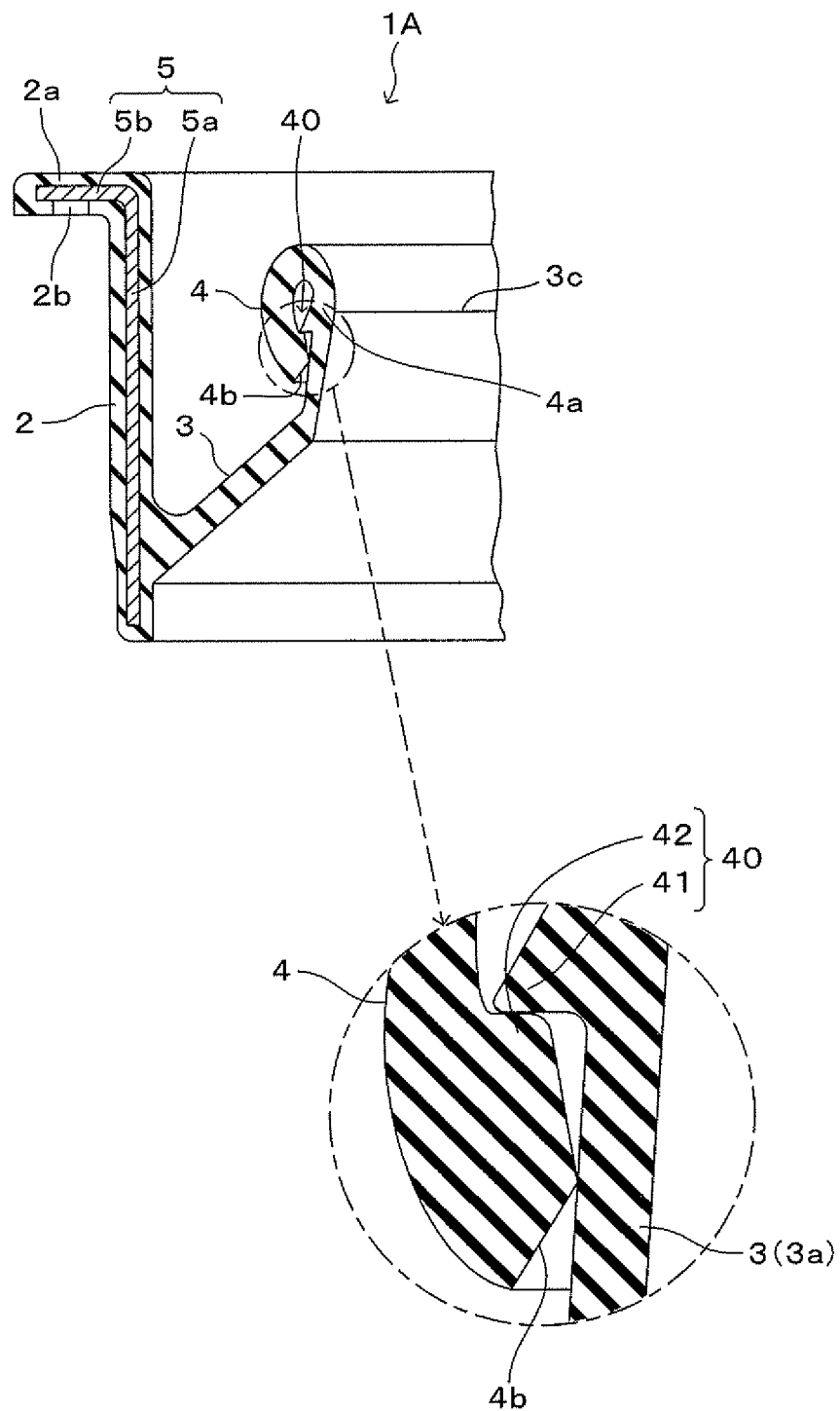
FIG. 10 is a vertical sectional view of a substantial part showing another modified example of the above-mentioned annular elastic gasket.

FIG. 10 shows another modified example of the annular elastic gasket 1A of the above-mentioned embodiment. The annular elastic gasket 1A in this example is characterized by providing an engagement portion 40 which engages the back portion in the centrifugal direction of the tip side portion 3a of the seal lip portion 3 and the elastic extending portion 4, respectively, in addition to the characteristic in which the elastic extending portion 4 is formed thicker than the tip side portion 3a of the seal lip portion 3 toward the tip end portion 4b. A first jaw portion 41 is formed on the back portion of the tip side portion 3a in the centrifugal direction and a second jaw portion 42 in the form of a hook is formed in the centripetal direction around the tip end portion 4b of the elastic extending portion 4. Both jaw portions 41, 42 are engaged when the elastic extending portion 4 is turned back in the centrifugal direction, thereby constituting the engagement portion 40. When such an engagement portion 40 is formed, the elastic extending portion 4 stably keeps the turned back condition in addition to the fact that the contracting elastic force becomes larger. Therefore, there is no fear that the elastic extending portion 4 returns to the centripetal direction during storage or transportation or when the cooling pipe 30 is inserted under pressure.

The cutout portion 4c shown in FIG. 8 can be formed in the example shown in FIG. 9 or FIG. 10. In such a case, special advantageous effects in each example have synergetic results and practical applicability further improves. Other structures in FIG. 9 and FIG. 10 are the same as those mentioned above, the same reference numbers are allotted for the common members, and their explanation is omitted here.

In the above-mentioned embodiments, the reinforcement member 5 is embedded in the gasket base body 2. However, the reinforcement member 5 is not necessary when the elastic material itself as a main material of a gasket has shape retention ability. The reinforcement member 5 is not limited to metal and may be hard synthetic resin or other materials with rigidity. Furthermore, the inverter case 20 of the internal combustion engine and the cooling pipe 30 penetrating therethrough are explained as an object to which the annular elastic gasket of the present invention is applied. However, the present invention is not limited to such application and the object can be a head cover of an internal combustion engine and a plug tube penetrating therethrough. In addition, the present invention can be applied between two members having such penetrating relation. Furthermore, the entire shape of the annular elastic gasket is not limited to the one shown in the figure, the annular elastic gasket may not have the outward flange portion 2a or the annular seal lip portion 3 may not be in the two-stepped tapered shape as shown in the figure and it may be gently curved.

REFERENCE SIGNS LIST 1, 1A annular elastic gasket
2 gasket base body 3 annular seal lip portion
3a tip side portion
3c smallest diameter portion
4 elastic extending portion
4a extending base portion (tip end of tip side portion)
4c cutout portion
5 reinforcement member
20 inverter case (housing)
20a insertion hole
30 cooling pipe (cylindrical body)
40 engagement portion

The invention claimed is:

1. An annular elastic gasket adapted to be disposed between an insertion hole formed in a housing and a cylindrical body which is inserted into said housing via said insertion hole in such a manner that said annular elastic gasket elastically contacts an inner surface of said insertion hole and an outer circumferential surface of said cylindrical body, said annular elastic gasket comprising:
 a hollow cylindrical gasket base body comprised of a molded body made of an elastic material;
 an annular seal lip portion extending in the centripetal direction from one end of said gasket base body; and
 an annular elastic extending portion further extending from an end of a tip side portion of said annular seal lip portion in the centripetal direction, wherein:
 said annular seal lip portion is to tapered so as to gradually narrow the diameter in the centripetal direction from said one end to the other end of said gasket body; and
 said gasket is held in said insertion hole of said housing in a compressed condition in such a manner that said one end from which said annular seal lip portion of said gasket body extends is positioned inside, and said elastic extending portion elastically expands in the diametrical direction together with said tip side portion of said annular seal lip portion, thereby said elastic extending portion elastically contacts said outer circumferential surface of said cylindrical body while maintaining elastic restoring force in the contracting direction.

2. The annular elastic gasket as set forth in claim 1, wherein said elastic extending portion is constructed such that it elastically contacts said outer circumferential surface of said cylindrical body when said cylindrical body is inserted into said insertion hole.

3. The annular elastic gasket as set forth in claim 2, wherein said tip side portion of said annular seal lip portion is constructed such that it elastically contacts said outer circumferential surface of said cylindrical body when said cylindrical body is inserted into said insertion hole.

4. The annular elastic gasket as set forth in claim 1, wherein:
 a reinforcement member is embedded in said gasket base body.

5. An annular elastic gasket adapted to be disposed between an insertion hole formed in a housing and a cylindrical body which is inserted into said housing via said insertion hole in such a manner that said annular elastic gasket elastically contacts an inner surface of said insertion hole and an outer circumferential surface of said cylindrical body, said annular elastic gasket comprising:
 a hollow cylindrical gasket base body comprised of a molded body of an elastic material;
 an annular seal lip portion extending in the centripetal direction from one end of said gasket base body; and
 an elastic extending portion further extending from an end of a tip side portion of said annular seal lip portion in the centripetal direction, wherein:
 said annular seal lip portion is tapered so as to gradually narrow the diameter in the centripetal direction from one end to the other end of said gasket body;
 said elastic extending portion which is positioned in the centripetal direction is turned back in the centripetal direction so as to overlap the back of said tip side portion of said annular seal lip portion;
 said gasket is held in said insertion hole in a compressed condition in said housing in such a manner that said one end from which said annular seal lip portion of said gasket body extends is positioned inside; and
 said elastic extending portion elastically contacts said outer circumferential surface of said cylindrical body with said tip side portion being interposed.

6. The annular elastic gasket as set forth in claim 5, wherein:
 said tip side portion of said seal lip portion is provided with a smallest diameter portion which elastically contacts said outer circumferential surface of said cylindrical body.

7. The annular elastic gasket as set forth in claim 5, wherein:
 said elastic extending portion is formed thicker than said tip side portion of said seal lip portion.

8. The annular elastic gasket as set forth in claim 7, wherein corresponding engagement portions which engage each other are provided at the back of said tip side portion of said seal lip portion in the centrifugal direction and said elastic extending portion, respectively.

9. The annular elastic gasket as set forth in claim 5, wherein:
 said elastic extending portion has a plurality of cutout portions formed intermittently along its circumferential direction.

* * * * *